United States Patent
Cressy et al.

(10) Patent No.: US 6,457,258 B1
(45) Date of Patent: Oct. 1, 2002

(54) DRYING ASSEMBLY AND METHOD OF DRYING FOR A FLOODED ENCLOSED SPACE

(76) Inventors: Charles S. Cressy, 309 Lincoln Dr., Ocean, NJ (US) 07712; Michael Tufariello, 1508 Dorsett Dock Rd., Point Pleasant, NJ (US) 08742

( * ) Notice: Subject to any disclaimer, the term of this patent is extended or adjusted under 35 U.S.C. 154(b) by 0 days.

(21) Appl. No.: 09/799,925

(22) Filed: Mar. 6, 2001

(51) Int. Cl.[7] .............................................. F26B 21/08
(52) U.S. Cl. ........................... 34/443; 34/218; 34/234; 34/235
(58) Field of Search ............................... 454/233, 236, 454/49; 34/443, 84, 218, 220, 223, 234, 235

(56) References Cited

U.S. PATENT DOCUMENTS 4,836,096 A * 6/1989 Avery ........................ 165/246
4,993,629 A * 2/1991 Wylie .......................... 236/11
5,090,972 A * 2/1992 Eller et al. ................... 134/111
6,126,540 A * 10/2000 Janu et al. ................... 165/249

FOREIGN PATENT DOCUMENTS

WO    WO 91/12476    * 8/1991    ........... F26B/21/08

* cited by examiner

*Primary Examiner*—Jiping Lu
(74) *Attorney, Agent, or Firm*—Clifford G. Frayne

(57) ABSTRACT

A portable trailer mounted drying assembly for the drying of an enclosed space which has been subjected to flooding, the drying assembly having an inlet path for the introduction of ambient air into the enclosed space, the ambient air being preheated in a heat exchanger by moisture laden air removed from the enclosed space, the preheated ambient air being subjected to further heating before introduction into the enclosed space, the portable trailer mounted unit being positioned proximate to the enclosed space and having a plurality of conduits in communication with the enclosed space for the introduction of dry heated air and the removal of moisture laden air.

9 Claims, 2 Drawing Sheets

DRYING ASSEMBLY AND METHOD OF DRYING FOR A FLOODED ENCLOSED SPACE

BACKGROUND OF THE INVENTION

1. Field of the Invention

The present invention relates to drying assemblies, and in particular, to a portable drying assembly for drying out businesses and residences that have been subjected to flooding.

2. Description of the Prior Art

Residences and businesses are oftentimes subjected to flooding, sometimes of a natural occurrence and sometimes the result of a broken water pipe. The water so introduced into the residence or business permeates everything which it contacts up to the level of the flood water and additionally generates a relatively high humidity within the residence or business which can affect walls and ceilings significantly higher than the flood line.

The only recourse in such a situation was to strip off and discard the affected floor coverings, remove the damaged furniture, and dismantle the damaged wall coverings and ceilings. Then portable dryers would be positioned in the affected area to circulate air in an effort to dry out the water soaked floor boards, wall studs and ceiling joists. These drying units were relatively small and capable of being transported by hand and positioned at various locations within the residence or business. While these devices did affect the drying out of the flooded area, they did not do so efficiently or efficaciously. In fact, they took significant time to effectuate the drying process and in doing so allowed for mold to form on the interior framing of the residence or business. If this mold was not noticed and not removed, it would be covered up when the interior walls were re-sheet rocked and then such mold would then present a health hazard once the residence or business was reinhabited.

Therefore there was a need for a drying unit which could dry out a damaged residence or business more efficaciously and more quickly. Applicant's novel drying unit addresses and solves this problem. There is still the necessity to remove water soaked floor coverings, furniture and sheetrock, however, Applicant's unit supplies extremely dry, hot air in sufficient volumetric quantity to dry a comparable residence or business in approximately 10% of the time, thereby preventing the growth of mold and further permitting the inhabitant of the residence or business earlier access to the premises to effect repairs and redecorating.

OBJECTS OF THE INVENTION

An object of the present invention is to provide for a novel drying assembly to dry out a residence or business subjected to flooding wherein the drying assembly introduces heated, ambient, low humidity air into the dwelling unit and removes moisture laden air from the flooded unit.

Another object of the present invention is to provide a novel drying assembly for drying a residence or business subjected to flooding in which the moisture laden air is utilized to preheat the ambient air in a heat exchanger prior to its introduction to the residence or business.

Another object of the present invention is to provide a novel drying assembly for the drying of a residence or business subjected to flooding in which preheated low humidity ambient air is introduced into the residence or business in sufficient volume to prevent the growth of mold.

A still further object of the present invention is to provide for a novel drying assembly which is portable and self-contained on its own trailer and can travel to a flooded residence or business and be positioned externally from the flooded area.

SUMMARY OF THE INVENTION

A portable, trailer mounted drying assembly for the drying of a residence or business which has been subjected to flooding, the drying assembly having an inlet path for the introduction of ambient air into the residence or business, the drying assembly further having an outlet path for the evacuation of moisture laden air from the residence or business, each path having associated therewith a variable speed blower to insure the desired volumetric capacity regardless of the lengths of the paths, the inlet path and the outlet path both passing through a common preheat exchanger wherein the moisture laden air preheats the ambient air, the preheated ambient air being further subjected to heating in a heater, the heater being in communication with a fuel source, the conduits extending from said heater into said residence or business, and the conduit extending from the residence or business back to the preheat exchanger for moisture laden air, both being flexible conduits of a sufficient diameter to achieve the desired volumetric flow rate.

BRIEF DESCRIPTION OF THE DRAWINGS

These and other objects of the present invention will become evident particularly when taken in light of the following illustrations wherein.

DETAILED DESCRIPTION OF THE DRAWINGS

Figure 1:
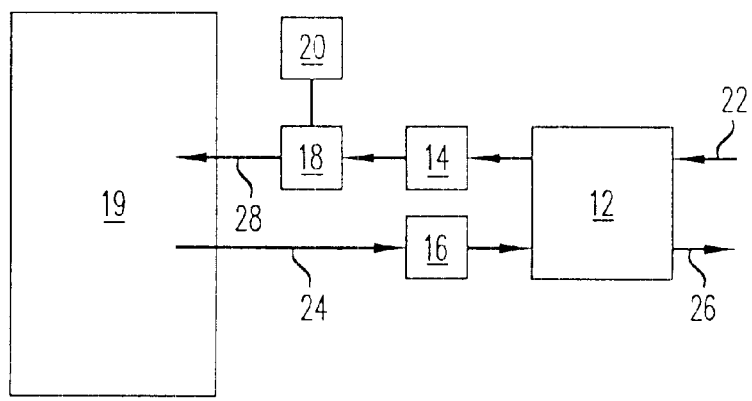
FIG. 1 is a schematic diagram of the drying assembly of the present invention.

FIG. 1 is a schematic drawing of the drying assembly 10. The drying assembly 10 is comprised of several essential elements, the first being a plate heat exchanger 12 which preheats the ambient air as more fully described hereafter. There is also included a first variable speed blower 14 in the inlet path and a second variable speed blower 16 in the outlet path. The inlet path also includes a heater 18. Heater 18 is in communication with a fuel source 20.

Figure 2:
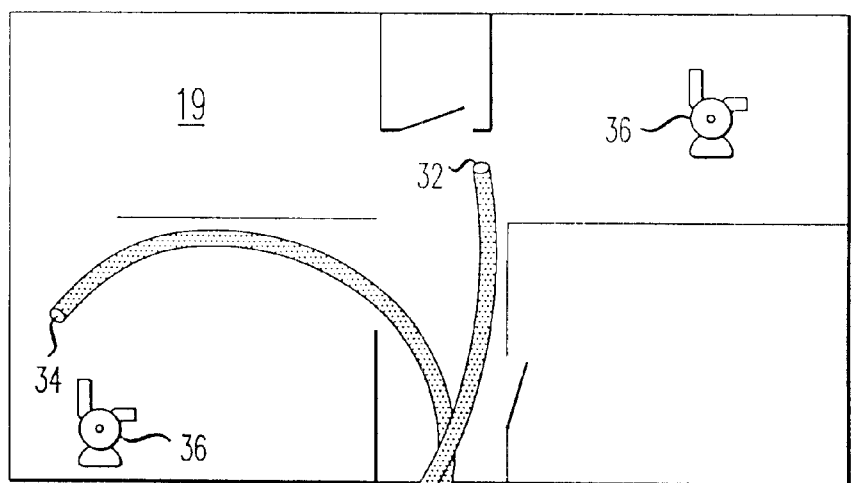
FIG. 2 is a top planar view of the drying assembly with the portable trailer roof removed and a residence having been subjected to flooding with its roof removed.
Figure 2:
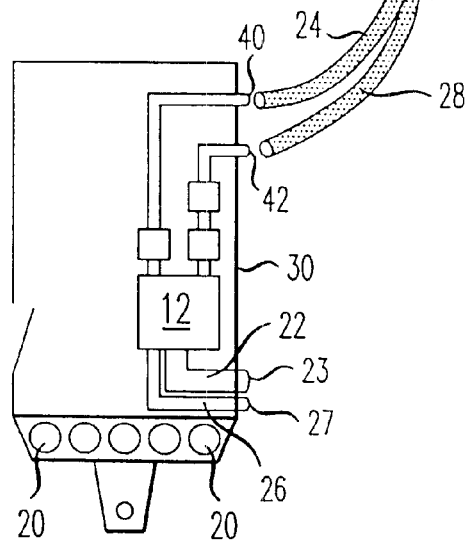

In the preferred embodiment as will be illustrated in FIG. 2, these elements would be mounted on an enclosed trailer providing portability of the assembly and its ability to proximate itself to the residence or business which has been subjected to flooding. At steady state operation with heater 18 at the desired temperature and both variable speed motors 14 and 16 operational, ambient air would be drawn in via conduit 22 and inlet port and introduced into flat plate heat exchanger 12 where it would pass through discrete passageways. Moisture laden air drawn from the residence or business 19, via conduit 24 by means of variable speed blower 16 would be introduced into a flat plate heat exchange 12 in counterflow to the ambient air through separate discrete passageways. The moisture laden air from the residence or business would serve to preheat the ambient air in flat plate exchange 12 prior to the moisture laden air being evacuated to the atmosphere via conduit 26 through outlet port 27. The preheated ambient air is then communicated via variable speed blower 14 to heater 18 where its temperature is increased to approximately 125 degrees Fahrenheit at which time it is then introduced into the residence or business 19 having been subjected to flooding by means of conduit 28 at the approximate rate of 2,000 cubic feet per minute. The fuel source 20 for the heater 18 is preferably a plurality of propane tanks which would be mounted exteriorly to the trailer.

One of the advantages of the design of this assembly is that the ambient air drawn into the assembly can be ambient air of any meteorological condition since its subjection to a preheater and heater results in an air flow introduced into the residence or business which is of extremely low humidity and at a temperature of approximately 125 degrees. The volumetric amount of flow results in extremely fast drying and the development of a high humidity evacuation flow stream.

In the present operation, the furnace or heating unit 18 is rated at 175,000 btu. The variable speed blowers are rated at 2,000 cubic feet per minute. The heat exchanger is also rated for 2,000 cubic feet per minute and has 1,500 square feet of heat exchange surface with the plates being spaced 0.25 inches apart. Inlet conduit 28 and return conduit 24 having been utilized with lengths of up to 300 feet and still have achieved the optimum drying.

As an example of steady state operation, the unit was operating on a residence when the ambient temperature was 30° F. The moisture laden air being returned from the building was 85° F. and the temperature of the inlet air after passing through the heat exchanger was raised from 30° F. to 79° F. It was then heated with the furnace to a temperature of 125° F. and introduced into the residence with a relative humidity of less than 5%.

The conduits 28 and 24 as illustrated in FIG. 2 can be introduced into the space to be dried via a door or window with the remainder of the window or door opening taped over to insure a sealing affect within. The ends 32 and 34 of conduits 24 and 28 may be positioned within the residence or business in accordance with where the most serious flooding took place. Additionally, fans 36 may be positioned within the residence or business to help circulate the heated incoming air.

Figure 3:
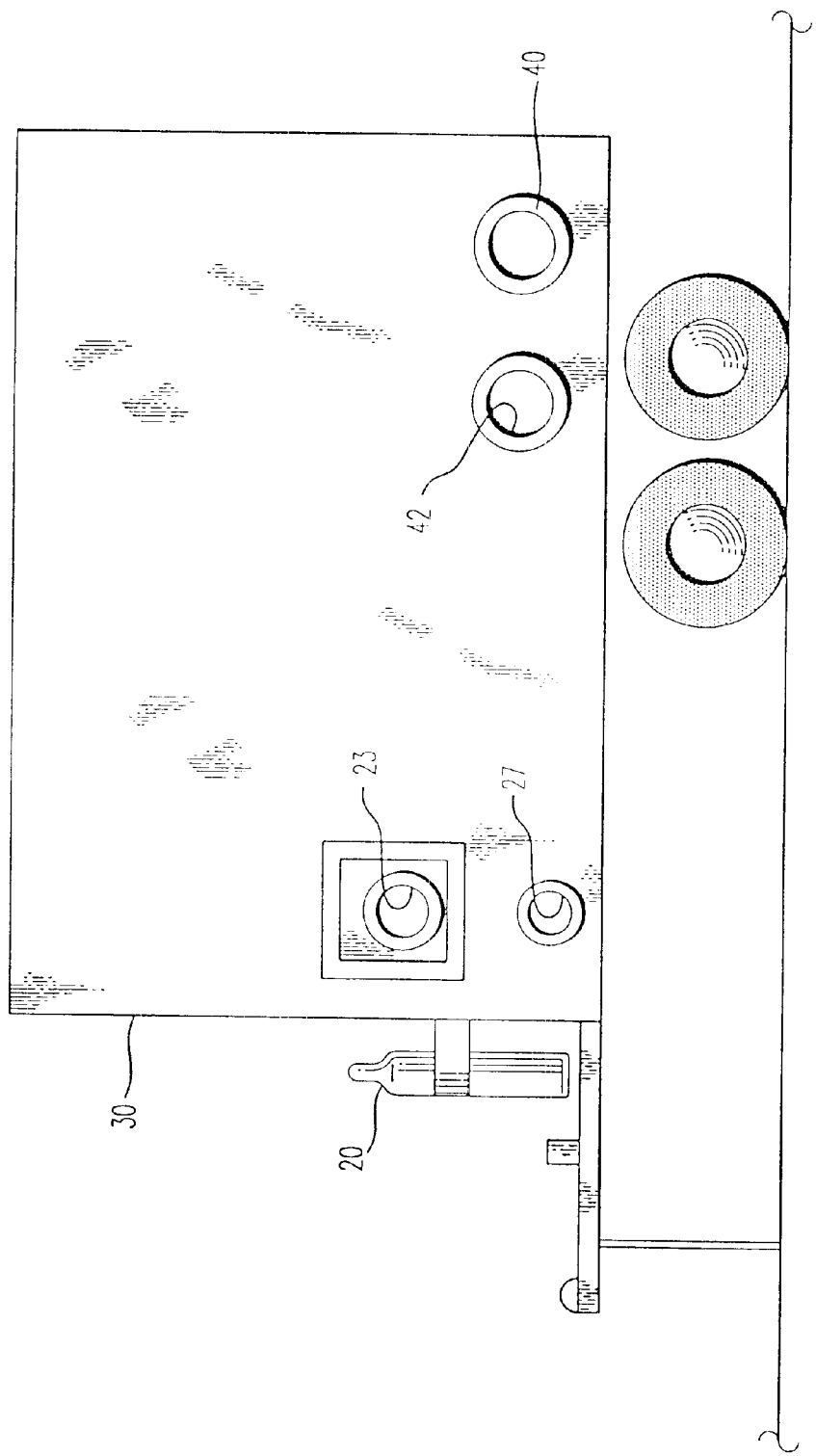
FIG. 3 is a side view of the drying assembly portable trailer.

Conduits 24 and 28 are preferably a reinforced, flexible conduit and a diameter of 14 inches has been found suitable to achieve the desired flow rate. They can be snaked about the room layouts of the residence or business and can from time to time be repositioned. The same holds true for the circulating fans 36. In the design, all the conduit connections within the trailer 30 would be fixed sheet metal connections. Preferably conduits 24 and 28 would be engaged and secured about the return port 40 and outlet port 42 respectively. FIG. 3 is a side view of the trailer further illustrating one possible layout of these ports. Further, the layout of the interior of the trailer is designed such that conduits 24 and 28 may be stored therein when the trailer 30 is traveling from site to site.

The design of the assembly and its portability allows it to be positioned proximate the flooded building and to operate at steady state unattended with the exception of insuring an adequate supply of fuel to the furnace.

While the present invention has been described with respect to the exemplary embodiments thereof, it will be recognized by those of ordinary skill in the art that many modifications and changes can be made without departing from the spirit and scope of the invention. Therefore it is manifestly intended that the invention be limited only be the claims and the equivalence thereof.

We claim:
1. A portable assembly for drying an enclosed space comprising:
   an energy exchange unit, said energy exchange unit having,
      an ambient air inlet for the introduction of ambient air;
      an exhaust air inlet for the introduction of moisture laden exhaust air from an enclosed space, said moisture laden exhaust air having thermal energy;
      a heat exchanger accepting said ambient air from said ambient air inlet and said moisture laden exhaust air from said exhaust air inlet, said heat exchanger having a plurality of first discrete channels for the passage of said ambient air and a plurality of second discrete channels in alternating arrangement with said first discrete channels for the passage of said moisture laden exhaust air in counterflow to said ambient air, thereby preheating said ambient air, said heat exchanger having an exhaust air outlet for venting said moisture laden air to the atmosphere and an ambient air outlet;
   a furnace means for further heating said ambient air;
   fuel source for said furnace;
   conduit means for directing said heated ambient air to said enclosed space;
   a first propulsion means for transporting said ambient air from said ambient air inlet to said enclosed space;
   conduit means directing said exhaust air to said atmosphere; and
   a second propulsion means for transporting said exhaust air from said enclosed space to said atmosphere.

2. The portable assembly for drying an enclosed space in accordance with claim 1 wherein said energy exchange unit, said furnace means, said propulsion means, and said fuel source means are mounted on a portable trailer.

3. The portable assembly for drying an enclosed space in accordance with claim 1 wherein said heat exchanger is a flat plate heat exchanger.

4. The portable assembly for drying an enclosed space in accordance with claim 3 wherein said flat plate heat exchanger has the capacity of 2,000 cubic feet per minute.

5. The portable assembly for drying an enclosed space in accordance with claim 1 wherein said first propulsion means and said second propulsion means comprise variable speed blowers.

6. The portable assembly for drying an enclosed space in accordance with claim 1 wherein said conduit means for directed said heated ambient air to said enclosed space comprises flexible reinforced tubing.

7. The portable assembly for drying an enclosed space in accordance with claim 6 wherein said flexible reinforced tubing is of a diameter of at least 3 feet.

8. The portable assembly for drying an enclosed space in accordance with claim 1 wherein said furnace means has a rated capacity sufficient to heat said ambient air to a temperature of 125°F.

9. A method of drying an enclosed space which has been subjected to flooding, said method comprising:
   mounting an energy exchange unit on a trailer, said energy exchange unit having an ambient air inlet and an exhaust air inlet, a heat exchanger having a plurality of first discrete channels and a plurality of second discrete channels in alternating arrangement with said first discrete channels and exhaust air outlet and an ambient air outlet;
   mounting a furnace means on said trailer in communication with said heat exchanger;

mounting a fuel source on said trailer in communication with said furnace;

mounting a first propulsion means and a second propulsion means on said trailer in communication with said heat exchanger;

positioning said trailer proximate said enclosed space;

providing conduit means from said furnace means to said enclosed space;

providing conduit means from said enclosed space to said energy exchange unit;

activating said first propulsion means and said second propulsion means;

activating said furnace means;

introducing said ambient air into said heat exchanger through said first discrete channels;

introducing said exhaust air into said heat exchanger through said second discrete channels;

preheating said ambient air with said exhaust air in said heat exchanger;

venting said exhaust air to said atmosphere;

introducing said preheated ambient air to said furnace;

heating said preheated ambient air and introducing same into said enclosed space.

\* \* \* \* \*